July 4, 1944.  J. L. BUCKMASTER  2,352,615
TRANSFER METHOD AND INSTRUMENT
Filed April 22, 1943  4 Sheets-Sheet 1

Inventor
James L. Buckmaster
By J. T. Mothershead
Attorney

July 4, 1944.  J. L. BUCKMASTER  2,352,615
TRANSFER METHOD AND INSTRUMENT
Filed April 22, 1943   4 Sheets-Sheet 2

Inventor
James L. Buckmaster
By J. F. Mothershead
Attorney

July 4, 1944.  J. L. BUCKMASTER  2,352,615
TRANSFER METHOD AND INSTRUMENT
Filed April 22, 1943   4 Sheets-Sheet 3

Inventor
James L. Buckmaster
By J. F. Morhushead
Attorney

July 4, 1944.  J. L. BUCKMASTER  2,352,615
TRANSFER METHOD AND INSTRUMENT
Filed April 22, 1943  4 Sheets-Sheet 4

Inventor
James L. Buckmaster
By J. F. Mothershead
Attorney

Patented July 4, 1944

2,352,615

UNITED STATES PATENT OFFICE 2,352,615

TRANSFER METHOD AND INSTRUMENT

James L. Buckmaster, Arlington, Va.

Application April 22, 1943, Serial No. 484,089

14 Claims. (Cl. 88—24)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

This invention relates to a method and an instrument for use in transferring detail from one medium to a second medium. The invention has particular application in the field of photogrammetry and for purposes of illustration, will, therefore, be disclosed as it would be used in such field. Other fields, where the principles and features of this invention may be used to advantage, will be obvious from an understanding of this disclosure and are within the scope of this invention.

Aeronautical charts are produced by the compilation of cartographic data from aerial photographs. According to one photographic method, three wide angle single lens cameras are mounted in an airplane to produce a vertical photograph and two oblique photographs by simultaneous exposures. The angular relationship between the cameras taking the oblique photographs (and also the angular relationship of their optical axes) is usually approximately 120° although the angle may be of different degree. The oblique angle is usually bisected by the third camera (the vertical camera taking a vertical photograph) and also its optical axis. The result of the three simultaneous exposures is in effect, a photograph from horizon to opposite horizon with sufficient overlap of the vertical photograph on the oblique photographs to permit a desired map assembly of the three prints and the transfer of their detail to the same map base. For purposes of illustration, this invention will be explained as it would be used with oblique photographs taken by cameras which have their optical axes forming an oblique angle of 120°. An understanding of this invention, however, will show how it may be practiced with photographs taken by cameras having other angular relations.

With the oblique cameras relatively arranged to form an oblique angle of 120°, the selected depression angle of each oblique camera is 30°. This selected depression angle is the angle between a horizontal plane and the camera optical axis when the airplane is is normal, level flight. Actually, the true depression angle of the camera at the instant of camera exposure may somewhat deviate from the selected depression angle. The deviation is usually about one degree and seldom exceeds five degrees. This deviation is the result of the airplane being tilted from normal flying position by atmospheric conditions, such as air currents, air pockets, and the like. The angle of deviation will be the angle of tilt of the airplane.

The method and instrument of this invention enable a cartographer or sketcher to copy detail from an oblique aerial photograph onto a map base with the tilted detail of the photograph transformed to untilted detail on the map. Thus the map detail will appear as if taken with an aerial camera having a true or substantially vertical optical axis. In the method and instrument of this invention, the cartographer views the photograph and the map base with camera lucida mirrors. The cartographer will observe a virtual image of the photograph as apparently disposed on the surface and in the plane of the map base. By tracing on the map base, the outlines and details of the photograph image, a rectified copy of the photograph is secured.

One object of the invention, therefore, is to provide a method for rectifying detail in the transfer of the detail from one medium to a second medium.

A further object is to provide a method for transferring the detail of a tilted or oblique aerial photograph to a map base with the photograph tilt rectified to secure a map having detail thereon substantially or entirely free of tilt and with or without change in scale.

Another object is to provide a method for using camera lucida mirrors and sketching map bases in the making of a map or section thereof from a tilted or oblique photograph with the photograph detail corrected for tilt.

A further object of this invention is to provide an optical instrument for use by a cartographer or sketcher in transferring detail from a tilted or oblique aerial photograph or the like to a map base or the like with the transferred details substantially free of tilt.

Another object of this invention is to provide a portable instrument which is adapted to rest on and to be slidably adjusted over a map base or manuscript, or table support therefor, which is adapted to support a tilted or oblique photograph having details to be transferred to the map base, and which is adapted optically to rectify the tilt of the oblique photograph. Thus, the instrument will enable a cartographer in copying detail from an oblique photograph to sketch such details on the map base substantially as they would appear in a truly vertical aerial photograph.

Still another object is to provide an oblique photograph transfer instrument which is readily adjustable and adapted optically to rectify the tilt of the photograph and provide the cartographer with an untilted view of the photograph on the map base as a guide in detail sketching.

A further object is to provide an oblique photograph transfer instrument which is relatively small, compact, lightweight, and portable to facilitate its use on a map base, and which provides minimum obstruction to illumination of the photograph being copied and the map being sketched.

Other objects and advantages of this invention will be readily apparent from an understanding of the following disclosure, the appended claims, and the accompanying drawings, wherein—

Figure 3:
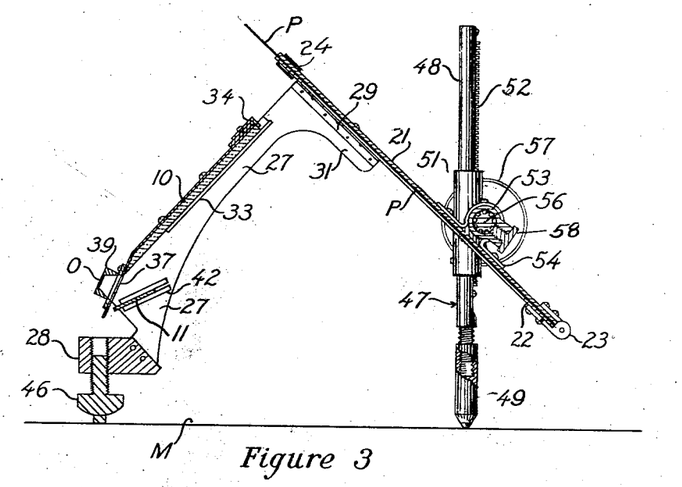
Fig. 3 is a longitudinal, cross-sectional view taken on line 3—3 of Fig. 1.
Figure 7:
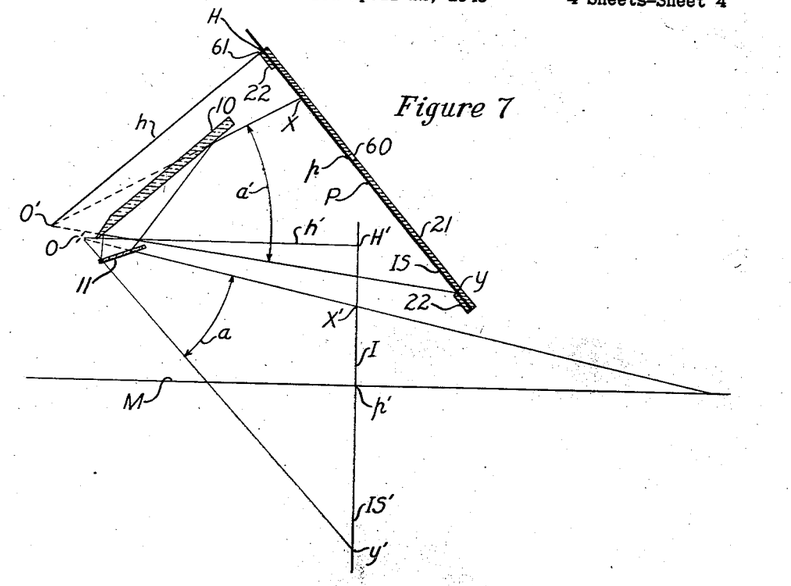
Figs. 7, 8, 9 and 10 are more or less diagrammatic views to illustrate features of this invention.

The optical system (see Fig. 7) of the illustrated instrument comprises a mirror 10 and a semi-transparent or semi-transmitting mirror 11. The mirror 10 reflects an image of a photograph P, the reflection being received by the mirror 11. The cartographer or sketcher positions his eye at the perspective point O and views a map base M through the semi-transparent mirror 11 (Figs. 3 and 7). Since the mirror 11 is semi-transparent, it reflects an image of the photograph P, the reflection being observed at the perspective point O. When viewed from the perspective point O, a virtual image I of the photograph P appears to be disposed on the surface of the map base M, providing the instrument is properly adjusted. Thus, the photograph image I is traced by the sketcher with a pencil, or the like, to transfer detail of the photograph P to the map base M. The mirror 10 is provided so that the observed photograph image will appear in a direct or upright position on the map base M.

The two mirrors 10 and 11 are arranged in such angular relation that the photograph reflection from the mirror 10 is directed along lines passing through mirror 11.

Figure 1:
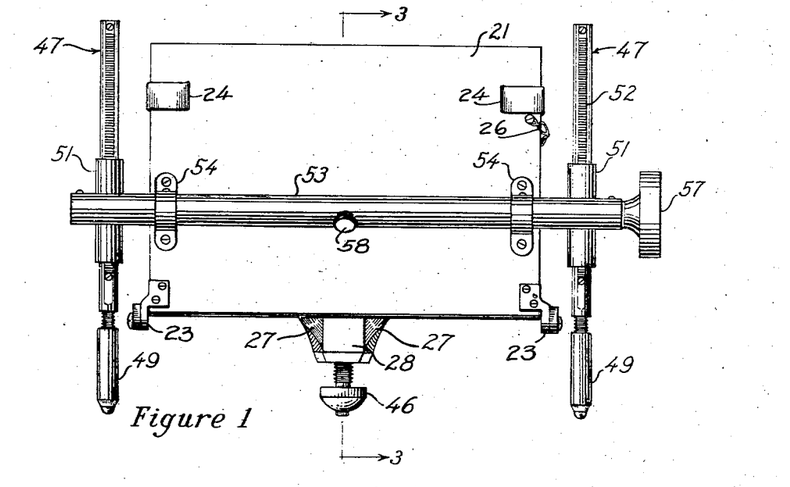
Fig. 1 is a rear elevational view of an instrument embodying this invention.
Figure 2:
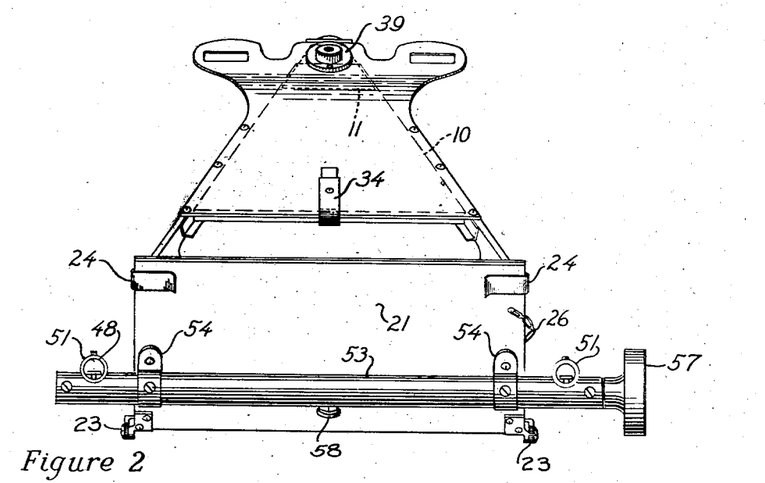
Fig. 2 is a top plan view of the instrument illustrated in Fig. 1.

The mirrors 10 and 11 are the first (or front) surface reflecting type to avoid double image effects. Possibility of distortion may also be minimized by the use of special flat quality glass for the mirrors 10 and 11. Each mirror (10 and 11) also preferably has the shape of a trapezoid, the parallel edges being the front and rear edges with the front edge the smaller of the two (see Fig. 2). The trapezoidal shape for the mirrors secures a wide field of view with minimum light shielding, and contributes to the lightweight and small overall size features which characterize this instrument.

The mirror 10 has its reflecting surface on its underside, looking at Fig. 3. The mirror 11 has its reflecting surface on its upperside and toward the mirror 10. The reflecting characteristic of the mirror 11 may be obtained by an upper surface, thin, uniform semi-transparent coating or deposit of silver, aluminum, or other metal or non-metal material having reflecting properties. This thin reflecting coating or surface provides a uniform, continuous image of the photograph P over the entire field of view.

During use of the instrument in sketching operations, the relative positioning of the mirrors 10 and 11, the perspective point O, and the photograph P are fixed and are not altered by either scale or tilt adjustments of the instrument.

For the purpose of disclosing, illustrating, and describing an embodiment of this invention, reference will be made to an oblique aerial camera having a selected depression angle of 30 degrees and an actual depression angle which is also 30° or deviates slightly from that selected. The photograph P of such camera will have corresponding tilt, selected depression angle, and actual depression angle. The invention, however, is to be understood as applicable in principle with tilted or oblique aerial photographs having selected depression angles which are more or less than 30 degrees and having actual depression angles of varying degree.

The instrument has a forwardly inclined object board 21 and an open frame 22, which are pivotally connected adjacent their rearward edges by means of a set of hinges 23. The photograph P is held face down and in flat condition against the lower face of the object board 21 by means of the frame 22. The photograph P is clamped between the object board 21 and the frame 22, which are retained in clamping relation by removable, resilient clips 24. These clips 24 are removed when a photograph is to be inserted in or removed from the instrument. Relative movement of the board 21 and the frame 22 is limited by a short section of chain 26.

Figure 4:
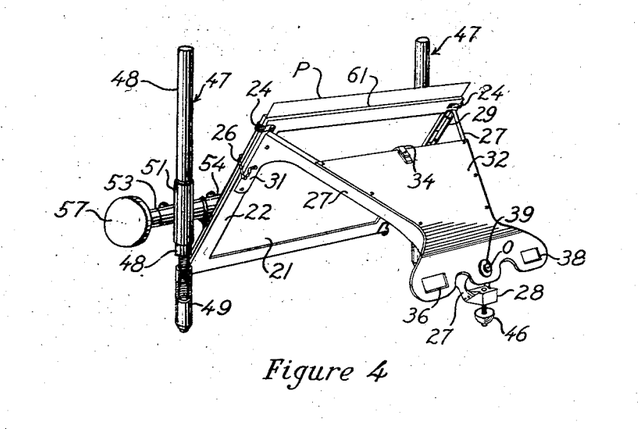
Fig. 4 is a perspective view of the instrument illustrated in Figs. 1 through 3. For purposes of illustration, Figs. 3 and 4 also show a photograph mounted in the instrument.

Two similar, inclined, narrow side frame members 27 extend forwardly and along converging lines from the frame 22 to a block 28. A short angle iron section 29 (Figs. 3 and 4) may be provided to form a reinforced connection between an arm 31 of each side frame member 27 and the top end of the corresponding side of the photograph frame 22. The forward ends of the side frame members 27 are secured, as by means of screws, to the opposite sides of the block 28 (Fig. 4).

A member 32, which may be of sheet metal, has several functions. It serves as a brace or reinforcement for the side frame members 27. For such purpose, the member 32 in its upper portion is shaped to correspond to the angular relation of the side frame members 27 and has its opposite side, marginal portions secured in suitable manner to the upper edges of the side frame members 27. The member 32 also provides a backing for the mirror 10. The mirror 10 may rest on flanges 33 (Fig. 3) which extend inwardly from the side frame members 27. A clip 34 may be removably mounted on the member 32, as illustrated, for retaining the mirror 10 in position relative to the member 32 and the side frame member flanges 33. By removing the clip 34, the mirror 10 may be removed by sliding it upwardly until it clears the flanges 33 and then lowering it in the space between the flanges 33.

It may be noted here that the angular relation of the side frame members 27 and also the shape of the upper portion of the member 32 correspond generally to the shape and proportions of the mirror 10.

The forward part of the member 32 is of diverging shape to provide sufficient width for three openings 36, 37 and 38. The central opening 37 is provided with a removable observation element 39 having a peep-hole to provide the actual perspective point O. The sketcher places one eye at the peep-hole O and views the map base M through the mirror 11. He may also view the map base M with his other eye which is positioned opposite one of the other openings (36 and 38).

The mirror 11 is removably secured in position by guides 42 which are mounted on the inner faces of the side frame members 27. Removal of the mirror 11 is secured by sliding it along the guides 42 and away from the observation element 39.

The block 28 is internally threaded for engagement with the threaded section of a thumb screw 46. The thumb screw 46 forms one of three adjustable legs of the present instrument. Adjustment of the effective length of the leg 46 is obtained by rotating it relative to the block 28. In a preferred position, the leg 46 underlies and is axially aligned with the peep-hole or perspective point O.

The other two legs (47) of the instrument are widely spaced and positioned adjacent the rear of the instrument and at opposite sides thereof. The legs 47 are similarly constructed and adjusted so that a description of one will suffice for both. A leg 47 comprises two sections 48 and 49 (Figs. 3 and 4). These two leg sections (48 and 49) have threaded connection whereby rotation of the leg section 49 is effective to change or adjust the overall leg length. The section or rod part 48 of the leg 47 is slidably received in a sleeve member 51 and carries a longitudinally extending rack 52. The sleeve member 51 is supported by and rigidly secured to a tubular shaft housing 53. The tubular housing 53 extends transversely of the object board 21 and is rigidly secured to the back thereof by any suitable means such as the straps 54. A shaft 56 (Fig. 3) is rotatably received within the tubular housing 53 and carries at one end a thumb wheel 57. The shaft 56 in cross-section has the shape of a pinion and is in mesh with the rack 52 of each of the two legs 47. If desired, the shaft 56 may be provided with a pinion shaped cross-section for only those two sections opposite the racks 52. The tubular housing 53 and the sleeve members 51 have complementary openings to accommodate the meshing of the leg racks 52 with the respective pinion sections of the shaft 56. It is thus apparent that the two legs 47 may be simultaneously and axially adjusted in the same direction along parallel lines by rotating the thumb wheel 57. This adjustment is secured through rack and pinion means and provides the same change in effective length for both of the legs 47. The leg sections 48 may be locked in adjusted position by means of a set screw 58 which engages the pinion shaft 56, as shown in Fig. 3.

Adjustment of the instrument by rotation of the thumb wheel 57 results in the instrument being tilted about a first axis which is parallel to the plane of the two legs 47 and which passes through the point of contact between the front leg 46 and the surface on which the leg 46 rests. The instrument may be tilted about a second axis by rotating the two leg sections 49 to the same degree in opposite directions, whereby one leg 47 will be shortened and the other leg 47 will be correspondingly lengthened. This second axis will be disposed on the surface on which the instrument rests, is perpendicular to the first tilting axis of the instrument, and intersects the first tilting axis at the point of contact between the leg 46 and the surface on which the leg 46 rests. Adjustment of the leg 46 tilts the instrument about a third axis, which will be disposed on the surface on which the instrument rests, which extends between the points of contact between the legs 47 and the surface on which the legs 47 rests, and which is perpendicular to the second tilting axes of the instrument.

A further adjustment for the instrument is the relative positioning of the photograph P on the object board 21 to adjust the photograph relative to the perspective point O' and the mirrors 10 and 11.

Figure 5:
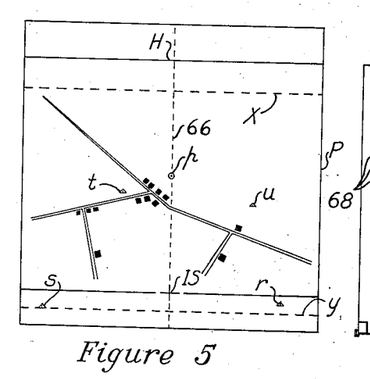
Fig. 5 is a view of the oblique photograph of Figs. 3 and 4.

An oblique aerial photograph P, which may be used with the illustrated instrument in the sketching of a map on the map base M, is shown in Fig. 5. For purposes of illustration, the photograph P will be assumed as having been taken with an oblique aerial camera having a selected depression angle of 30 degrees. This photograph P has a horizon line H, an iso-center or point IS, and a principal point $p$. The area extending between the dotted lines $x$ and $y$ (Fig. 5) represents the area of the detail to be transferred to the map base M. The horizon line H of the photograph may be determined in accordance with the conventional practice in aerial photographic surveying, as set out, for example, in the text entitled "The Principles and Practice of Surveying," volume 2, "Higher Surveying," by Charles B. Breed and George L. Hosmer, 5th edition (1938), published by John Wiley & Sons, Inc., of New York city, New York, and Chapman & Hall, Limited, of London. (See pages 413 and 414.) Usually the horizon line H will lie on the photograph P.

In those cases in which the horizon line for the photograph lies somewhat beyond its limits, the relation of such horizon line to the principal point $p$ may be determined by known methods. A principal line 66 would then be drawn on the photograph P for reference purposes, this line 66 being perpendicular to the determined horizon line and passing through the principal point $p$ of the photograph P. This reference line 66 may then be used in orienting the photograph P on the object board 21. The reference marks 67 (see Fig. 6) on the frame 22 are in register with the reference line 66 when the photograph P is properly oriented.

Figure 6:
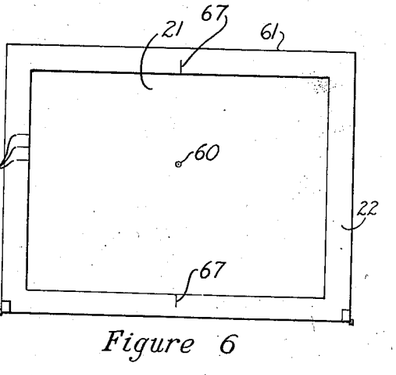
Fig. 6 is a plan view of the object board and frame for holding the photograph.

The photograph P of Fig. 5 is placed on the object board 21 of Fig. 6 with respect to points or lines of reference thereon. For example, the object board 21 may have a small pin hole at point 60 to coincide with the principal point $p$ of the photograph P when the latter is properly positioned on the object board 21. This positioning may be secured with a pin passed through the point $p$ of the photograph P. A line of reference may also be provided by the top edge 61 (see Fig. 6) of the frame 22. The photograph P is so placed on the object board 21 that the horizon line H coincides with the reference line 61 and the principal point $p$ registers with the aperture 60.

When the photograph P is properly adjusted to the object board 21, as above described, the object board 21 and the photograph frame 22 provide the position of the photograph P relative to the camera lucida mirrors 10 and 11 of this instrument, as illustrated in Fig. 7. Figure 7 shows the relative and fixed positions of the photograph P, the mirrors 10 and 11, the actual perspective point O, the virtual perspective point O', and the virtual image I of the photograph P. For purposes of illustration, the mirrors 10 and 11 may be, and are illustrated as arranged to form an angle of about 20 degrees. The mirrors 10 and 11 preferably form a small angle (less than 30°) and such an angle that there is no overlapping or interference of the field of view $a'$ of the virtual perspective O' with the field of view $a$ of the actual perspective point O (see Fig. 7). Thus, an object, such as the photograph P, placed within the field of view $a'$ of the virtual perspective point O' will not extend into the field of view $a$ of the actual perspective point O. The relative arrangement of the mirrors 10 and 11 and the actual and virtual perspective points O and O' may be determined in accordance with known optical principles to provide a relatively large field of view. A relatively small angle for the relation of the mirrors 10 and 11 is of advantage since it contributes to the relatively small overall size of the instrument and also facilitates the illumination of the photograph P and its direct observation through the opening which is formed between the top side of the frame 22 and the wall member 32.

With the optical system established, as described above, and as illustrated in Fig. 7, the angle $a$, representing the field of view of the actual perspective point O is approximately 37 or 38 degrees. The angle $a'$, representing the field of view for the virtual perspective point O', is likewise approximately 37 or 38 degrees. It will be noted that the photograph P is so positioned with respect to the virtual perspective point O' that the area of the photograph bounded by the lines $x$ and $y$ is entirely within the field of view of the virtual perspective point O', or within the angle $a'$. According to known optical principles, the virtual image I of the photograph P occupies the same position with respect to the actual perspective point O that the photograph P occupies with respect to the virtual perspective point O'. Therefore, the image area bounded by the lines $x'$ and $y'$, which corresponds to that bounded by the lines $x$ and $y$ of the photograph P, will lie within the field of view (angle $a$) of the actual perspective point O. The image lines referred to are perpendicular to the paper and pass through the points $x'$ and $y'$ of Fig. 7.

The horizon plane $h'$ for the image I of Fig. 7 is perpendicular to the plane of the paper and passes through both the actual perspective point O and the image horizon line H'. The horizon plane $h$ for the photograph P is likewise perpendicular to the plane of the paper and passes through the virtual perspective point O' and the horizon line H of the photograph P.

It will now be assumed that the actual depression angle of the photograph P is the same as the selected depression angle, namely, 30 degrees. Complete rectification of the photograph tilt is secured by positioning the map M in a plane which is parallel to the image horizon plane $h'$ and which intersects the field of view $a$ of the actual perspective point O. To secure a map of one-half scale, its plane should pass through the principal point $p'$ of the image I. This map plane for half scale is indicated in Fig. 7 by the line M, the plane being perpendicular to the plane of the paper. The resulting map will then be on the same scale as if it had been copied on half scale from a vertical photograph taken at the same elevation as the oblique photograph and with the same camera. A one-to-one scale for the map is secured by positioning the map base M in a plane which passes through the iso-center (point) IS' of the photograph image I. Thus, the map scale is determined by the spacing of the map base M and the horizon plane $h'$ of the photograph image I.

Figures 8, 10:
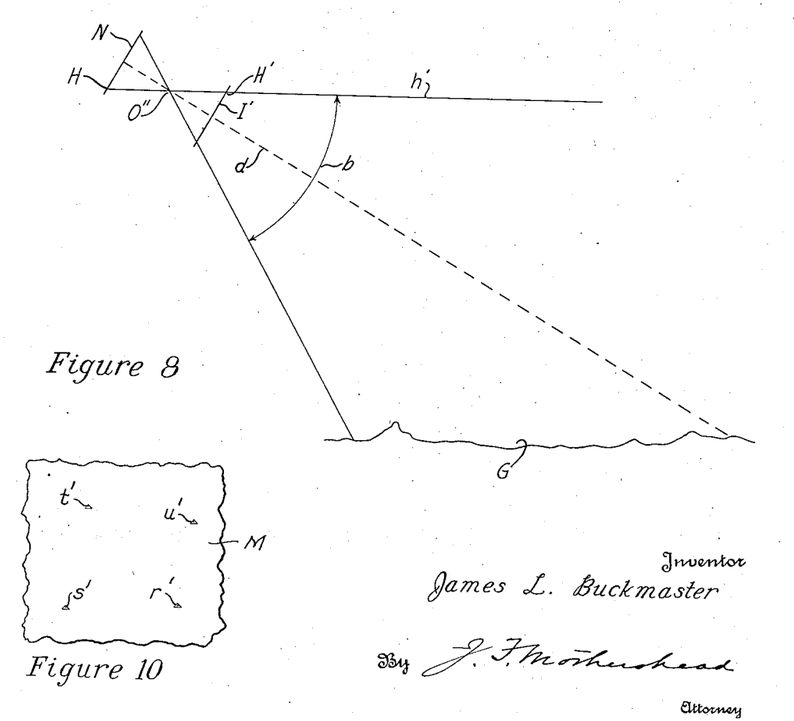
Figure 9:
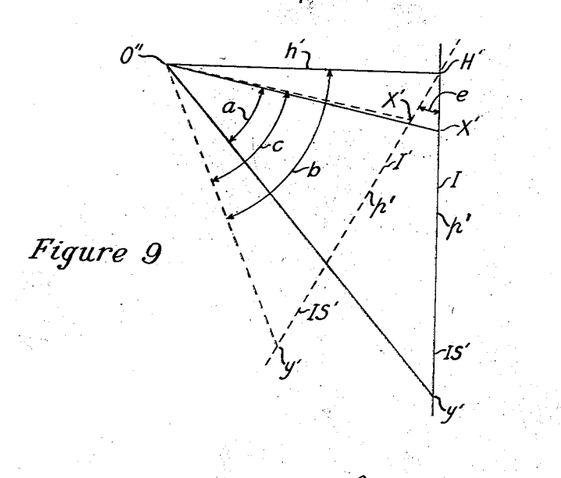

The method for determining the positions of the image I and the photograph P in the optical system of Fig. 7 is illustrated by Figs. 8 and 9. Figure 8 illustrates more or less diagrammatically the relation of the negative plane or film N, the camera perspective point or inner nodal point O'', the ground G, the horizon plane $h'$, and the angle or field of view $b$ at the instant of camera exposure with the camera having a selected depression angle and also an actual depression angle of 30 degrees. The position of the true positive of negative N is shown at I', the plane of the true positive position being perpendicular to the optical axis $d$ of the camera, the horizon line H' of the true positive lying in the horizon plane $h'$. It will be apparent that a rectified reproduction of the film N may be secured by reproducing the cone of rays $b$ of Fig. 8 with the eye of the observer at the point O'', a transparent positive of the film N in the position of the positive I', and a map base in a plane parallel to the horizon plane $h'$ and intersecting the cone of rays $b$.

Figure 9 shows an enlarged view of the perspective point O'', the true positive I', the cone of rays or angle of view $b$, and the horizon plane $h'$ in Fig. 8. Figure 9 also illustrates that an angle or the field of view $c$ is required to include the details between $x'$ and $y'$ of the true positive I', $x'$ and $y'$ corresponding to the lines $x$ and $y$ of the photograph P (Figs. 5 and 7). Figure 9 further shows the angle $a$ which corresponds to the field of view of the actual perspective point O in Fig. 7. The angular extent of the field of view from the perspective point O'' (Fig. 9), to include all the area of the true positive I' between the reference marks $x'$ and $y'$, is measured by the angle $c$, which is 55 degrees. Thus, it will be seen that, with a virtual photograph image in the position indicated by the true positive position I' of Fig. 9, only a fraction of the area between the reference marks $x'$ and $y'$ would lie within the field of view shown by the angle $a$, which is about 37 or 38 degrees. According to the present invention, the virtual image I is displaced from the true positive position I'. At the same time, rectification of the tilt of the camera photograph P is maintained, and all of the details of the photograph P which are to be reproduced are included in that area of the image I which is within the field of view denoted by the angle $a$. This result is obtained, in effect, by rotating the plane of the true positive I' through such an angle that the reference marks $x'$ and $y'$ are included within the field of view of the angle $a$. The axis of rotation for this angular displacement is the horizon line H' of the true positive I'. In the Fig. 9 illustration, the angular displacement in positioning the image plane is the angle $e$, which is 30 degrees, and corresponds, by coincidence, to the selected and actual depression angle of the camera photograph P.

Having determined a desirable position for the image I in the manner illustrated by Fig. 9, it may be readily positioned in the system of Fig. 7. If a tracing of Fig. 9 is superimposed on Fig. 7 with the camera perspective point O'' coinciding with the virtual perspective O' and with the horizon plane $h'$ of Fig. 9 coinciding with the photograph horizon plane $h$ of Fig. 7, the proper position for the photograph P in Fig. 7 is one in which it coincides with the image I of the tracing (Fig. 9). The horizon line H of the photograph P lies in the horizon plane $h$, and the plane of the photograph P forms the same angle with the horizon plane $h$ (Fig. 7) that the plane of the image I and the horizon plane $h'$ form in Fig. 9. It will be recalled that the image I of Fig. 7 takes the same position relative to the actual perspective point O that the photograph P bears with respect to the virtual perspective point O'. Therefore, the image plane I in Fig. 7 bears the same relation to its actual perspective point O that the image I of Fig. 9 bears to the camera perspective point O''. If we superimpose the tracing of Fig. 9 on the Fig. 7 with the camera perspective point O'', and its horizon plane $h'$ coinciding respectively with the actual perspective point O and the horizon plane $h'$ of Fig. 7, the image I of Fig. 9 will coincide with the image I of Fig. 7.

It may thus be stated that in an instrument of the character illustrated and described and for any given relationship of camera lucida mirrors and perspective points (virtual and actual), the photograph P (on a 1:1 scale compared with its original negative) is placed with its true horizon line H in the same relation to the virtual perspective point O' as the horizon line H in the plane of the negative N and the camera inner nodal point (perspective center) O'' had in the taking camera (Fig. 8). To include all desired detail of the photograph P in the field of view $a'$ of the virtual perspective point O', the photograph P is, in effect, rotated about its horizon line H as an axis. Since the desired detail of the photograph P is then completely within the field of view of the virtual perspective point O', the corresponding details of the virtual image I (Fig. 7) will be within the field of view $a$ of the actual perspective point O and have the same position in this second field $a$ as the photograph P has in the first field $a'$.

Having determined and provided the proper position for the photograph P, it may be copied and have its tilt rectified by placing the plane of the map base M so that it intersects the cone of rays or the field of view $a$ as illustrated, for example, in Fig. 7. If it be assumed that the actual depression angle of the camera in taking the photograph P was 30 degrees, the plane of the map base M will be parallel to the horizon plane $h'$ of the image I. If a map is to be dawn on one-half scale, the map base should intersect the virtual image I at the principal point $p'$.

In aeronautical map making, many oblique photographs are used and produced by oblique cameras having the same selected depression angle and the same focal length. In practicing the present invention, each instrument, therefore, is constructed for use with oblique photographs having a certain selected depression angle and a certain focal length. Any required tilt adjustment, due to the deviation of the actual depression angle of the oblique photograph from its selected depression angle, is accomplished by corresponding adjustment of the instrument legs 46 and 47. The spacing of the photograph horizon line H and the virtual perspective point O' is the same as the spacing of the taking camera perspective point O'' and the film horizon line H (Fig. 8) for photographs on a 1:1 scale. Where the photograph P is reduced or enlarged, the distance from the photograph horizon line H to the virtual perspective point O' is proportionally reduced or enlarged.

Method and operation

The map base or manuscript M, to which detail is to be transferred, is preferably placed on a flat, level surface, such as a horizontal table top or drawing board. The instrument of this invention is useful with both small and large map bases M. When the map base M is small, the instrument will rest directly on the table top. When the map base M is relatively large, the instrument will rest directly on the map base M (see Fig. 3).

The map base M and the instrument are so oriented that the sketcher, by placing his viewing eye at the actual perspective point O, may view the photograph image I and the corresponding section or area of the map base M. If a small map base M is used, orientation may be secured by shifting or sliding either the map base M or the instrument on the surface of the table top. If a large map base M is used, the instrument may be shifted over the surface of the map base M to secure proper orientation.

The photograph horizon line H (see Fig. 5) is determined in accordance with the conventional procedure followed in the art of photogrammetry. The principal point $p$ of the photograph P is also determined according to well known principles. The photograph P is then placed in the instrument and held against the object board 21 by the photograph frame 22. The photograph P is adjusted relative to the object board 21 until its principal point $p$ coincides with the reference mark 60 (see Figs. 6 and 7) and the horizon line H of the photograph P coincides or registers with the reference line or edge 61 of the photograph frame 22 (see Figs. 6 and 7). In the event the horizon line lies beyond the limits of the photograph P, the reference line 66 is provided on the photograph P and is used to orient the latter in the manner previously described. Having determined the position of the photograph P, it is secured in such position by means of the clips 24 which are fitted over the edges of the object board 21 and the frame 22, as shown in Fig. 4.

It is now understood that the object board 21, the photograph P, the mirrors 10 and 11, and the actual and virtual perspective point O and O' of the instrument have fixed relation to rectify a photograph tilt corresponding to the selected depression angle for the photograph and its camera. It will now be assumed, for purposes of illustration, that the actual depression angle of the camera is the same as the selected depression angle and that the desired scale for the map base is one-half. The instrument legs 46 and 47 are adjusted so that the plane of the map base M and the horizon plane $h'$ of the actual perspective point O (see Fig. 7) are parallel and are spaced at a distance corresponding to the spacing of the image horizon line H' and the principal point $p'$ of the image I (Fig. 7). This adjustment of the instrument is secured by adjusting one or more of the instrument legs 46 and 47. If the actual depression angle of the photograph P is the same as its selected depression angle, and some scale for the map base M, other than one-half is desired, the spacing of the image horizon plane $h'$ and the map base plane M is varied. The scale will vary directly with the spacing of the two planes.

It is characteristic of the illustrated instrument that the object board 21 and the optical system are arranged in fixed relation to rectify the tilt of all photographs made by oblique cameras having substantially the same selected depression angle and substantially the same focal length. If the actual depression angle of a photograph deviates from such selected depression angle, the angular deviation is substantially rectified by adjusting legs 46 and 47 of the instrument. For correcting this angular deviation, the instrument legs permit adjustment of the instrument about any one or more of three tilting axes lying in the plane of the map base M. Adjustment of the front leg 46 tilts the instrument about an axis extending between the two rear legs 47 and lying in the plane of the map base M. Adjustment of the two rear legs 47 equally in the same direction tilts the instrument about a second axis which is parallel to the first axis. The second axis passes through the intersection of the front leg 46 and the map base M. Adjustment of the instrument about a third axis is secured by adjusting the two rear leg sections 49 oppositely and in equal amount. This adjustment of the rear legs provides for tilting of the instrument about an axis which is perpendicular to the first and second axes and which passes through the point of contact of the front leg 46 with the map base M.

As a guide in making an aeronautical chart from a series of aerial photographs, each photograph is provided with a number of reference points or marks and the chart base is provided with corresponding reference points or marks. Thus the photograph P of Fig. 5 bears the reference marks r, s, t and u, and the map section (see Fig. 10), to which detail is to be transferred from the photograph P of Fig. 5, bears corresponding reference marks r', s', t', and u', which are plotted in proper map position. For purposes of illustration, the map section of Fig. 10 is shown on a scale which is one-half that of the basic oblique photograph (P) scale. To simplify the illustration, fewer reference points are shown than are usually available. Before the sketcher traces detail onto the section of the map base M of Fig. 10, the reference points of the image I (Fig. 7) which correspond to the reference points r, s, t and u of the photograph P (Fig. 5) are brought into registry with the corresponding points r', s', t' and u' on the map base M (Fig. 10). The points r, s, t and u are brought into registry with the points r', s', t' and u', respectively, by adjustment of the legs 46 and 47 and by orienting the instrument relative to the map base M.

When the instrument is properly adjusted and positioned, the sketcher on viewing through the aperture O of the element 39 will observe that the reference marks (r, s, t and u) of the image I of the photograph P appear to lie on the map base M and coincide with the reference points r', s', t' and u' thereof.

If the instrument is properly tilted, but the virtual image of the photograph reference points appears to be on a smaller scale than the corresponding points on the map base M, the points in the virtual image I are brought to the apparent map scale by raising the instrument by means of the adjustable leg 46 and the thumb wheel 57 without changing the tilt of the instrument. If the instrument is properly tilted, but the virtual image of the points appear to be on a larger scale than the corresponding points on the map base M, the instrument must be lowered to bring the points in the virtual photograph image to the same scale as those on the map without changing the tilt of the instrument.

If the instrument is not properly tilted for the photograph P and/or it is not accurately positioned in the instrument, the instrument is raised or lowered until the average scale of the reference points in the virtual image I appears to be approximately equal to the scale of the corresponding points on the map base (M). The apparent scale of the background of the virtual image I can be increased or decreased by respectively raising or lowering the rear of the instrument by means of thumb wheel 57. The apparent scale of the foreground of the virtual image can be increased or decreased by respectively raising or lowering the front end of the instrument by means of adjustable leg 46. The apparent scale of the right or left-hand side of the virtual image can be increased by turning the right or left foot (49), respectively, in a clockwise direction. The apparent scale of the front, back and sides of the virtual image of the photograph P can be thus brought to the same scale as that of the map base M, using the reference points r, s, t and u of Fig. 5 in comparison with the corresponding points r', s', t' and u' of Fig. 10 on the map base M to judge the difference in scale. When the scale of the four sides of the virtual image I of photograph P appears to be equal with that of the map base M (Fig. 10), the reference points r, s, t and u, in the virtual image I can be made to register with the corresponding points of the map M by slidably moving and orienting the instrument. When the instrument is adjusted so that the reference points are in registry, the detail can be traced onto the map M.

Having properly positioned the photograph P in the instrument, and adjusted the instrument for scale, and also for any deviation of the actual photograph depression angle from its selected depression angle, the sketcher is now ready to transfer the detail of the photograph P to the map base M. The sketcher places his eye at the actual perspective point O and views the map base M (see Fig. 3 or 7) through the semi-transparent mirror 11. In so viewing the map base M, he will also, by reason of the arrangement of the mirrors 10 and 11, see the virtual image I of the photograph P. This virtual image I will appear to the sketcher to be disposed on the surface of the map base M. The sketcher may transfer detail from the photograph P to the map base M by tracing the outline of the virtual image I as it appears on the surface of the map base M. The detail when sketched will be a rectified (untilted) reproduction or copy of the photograph detail.

The desired detail is transferred to the map base M, preferably with a pencil. The instrument may be shifted slightly from time to time, as the occasion may require in the sketching. In any position of orientation of the instrument on the map base M, the sketcher may copy all detail in the area between the lines x and y of the photograph P (Fig. 5).

As has been stated, the instrument legs 46 and 47 are adjustable to provide rectification corresponding substantially to the deviation of the actual depression angle of the photograph from its selected depression angle. Theoretically, perfect rectification, however, may be secured for this deviation if the photograph P is adjusted on the object board 21 so that the photograph horizon line H is spaced from the virtual perspective O' corresponding to spacing of the camera perspective point O'' and the negative horizon line H (see Fig. 8) in the taking camera. Such adjustment may be facilitated by a suitable scale or series of reference marks 68 provided on the instrument and on or adjacent the object board 21. Each of the marks 68 may represent a predetermined actual depression angle for a camera of given local length.

The foregoing is to be understood as illustrative, since this invention includes all modifications and embodiments within the scope of the appended claims.

I claim:

1. In an instrument for transferring detail from an oblique aerial photograph to a map base with the transferred detail in upright position and transformed to correct for photograph tilt, the combination comprising a forwardly inclined object board, a frame pivotally connected to said board for clamping thereto the oblique photograph, means for retaining said board and said frame in photograph clamping relation, frame members secured to the opposite sides of said photograph frame adjacent the top ends thereof and extending forwardly and downwardly along converging lines, a block secured to the forward ends of said frame members, a trapezoidal, plain mirror extending between and supported by said frame members, a trapezoidal, semi-transparent mirror extending between and supported by said frame members, said plain mirror reflecting an image of said photograph onto said semi-transparent mirror, observation means supported by said frame members and providing a peep-hole for viewing said semi-transparent mirror, a front leg having threaded engagement with said block and underlying said observation element, and a set of two adjustable rear legs, said rear legs being positioned at opposite sides of said object board and secured thereto.

2. In a method of sketching a map from an oblique aerial photograph with camera lucida mirrors having a virtual perspective point, an actual perspective point, and non-overlapping fields of view for the two perspective points, the steps comprising determining the horizon line of the photograph, placing the photograph in position to intersect the field of view of said virtual perspective point with the photograph horizon line in a relation to said virtual perspective point corresponding to the photograph scale and corresponding also to the relation of the horizon line of its original negative plane and the inner nodal point of the taking camera and with the photograph details to be copied within the field of view of said virtual perspective point, positioning a map base in a plane intersecting the field of view of said actual perspective point, viewing said map base from said actual perspective point, and tracing the outline of the virtual image of the photograph onto the map base.

3. A method as recited in claim 2, wherein the selected and actual depression angles of the photograph are determined, and the photograph tilt, due to the selected depression angle, is rectified by positioning of the map base in a plane horizontal to the horizon plane of the virtual image of the photograph.

4. A method as recited in claim 2, wherein the selected and actual depression angles of the photograph are determined, and the deviation of the actual depression angle from the selected depression angle is corrected by a corresponding angular relation of the map base and the horizon plane of the virtual photograph image.

5. A method as recited in claim 2, wherein the scale of the map base is determined by its spacing relative to the horizon line of the photograph virtual image.

6. In a method of sketching maps from oblique aerial photographs, the steps comprising determining the selected depression angle of an oblique aerial photograph and the photograph scale compared with the negative for the photograph, positioning the photograph in the field of view of the virtual perspective point of a set of camera lucida mirrors with the true horizon line for the photograph in a relation to the said virtual perspective point corresponding to the relation the horizon line of the photograph negative plane had to the perspective point of the taking camera and corresponding also to the photograph scale, the photograph position being angularly displaced about the true horizon line thereof as an axis to bring all details to be transferred to a map base within the field of view of said virtual perspective point, positioning the map base in a plane intersecting the field of view of the actual perspective point of said camera lucida mirrors, the map plane having such spacing and angular arrangement relative to the plane of said actual perspective point and the horizon line of the virtual image of the photograph as to provide a predetermined scale for the map and rectification for tilt variation of the photograph from the selected depression angle, and sketching on the map details of said virtual image to secure map details as they would appear if taken with a truly vertical aerial camera.

7. In an instrument for transferring detail from an oblique aerial photograph to a map base with the transferred detail in upright position and transformed to correct for photograph tilt, the combination comprising a forwardly inclined object board, a frame pivotally connected to said board for clamping to the underside thereof an oblique photograph, frame members secured to the opposite sides of said photograph frame adjacent the top ends thereof and extending forwardly and downwardly along converging lines, means connecting the forward ends of said frame members, a trapezoidal, plain mirror extending between and supported by said frame members, a trapezoidal, semi-transparent mirror extending between and supported by said frame members, said plain mirror reflecting an image of said photograph onto said semi-transparent mirror, observation means supported by said frame members and providing a peep-hole for viewing said semi-transparent mirror, an adjustable front leg underlying said observation element and supporting said connecting means in elevated position, and a set of two rear legs positioned at opposite sides of said object board and frame, said rear legs being adjustable to alter the effective length thereof and the elevation of said board and frame.

8. In an instrument for transferring detail from an oblique aerial photograph to a map base with the transferred detail in upright position and transformed to correct for photograph tilt, the combination comprising a forwardly inclined object board, means for clamping a photograph to the underside of said board, frame members extending forwardly from adjacent the upper portions of the opposite sides of said board and downwardly along converging lines, means connecting the forward ends of said frame members, a set of camera lucida mirrors extending between and supported by said frame members for reflecting an image of said photograph, observation means supported by said frame members and providing a peep-hole for viewing the photograph image reflected by said mirrors, an adjustable front leg underlying said observation means and supporting said connecting means in elevated position, and a set of two adjustable rear legs, said rear legs being positioned at opposite sides of said object board and secured thereto.

9. In an instrument for transferring detail from an oblique aerial photograph to a map base with the transferred detail in upright position and transformed to correct for photograph tilt, the combination comprising a forwardly inclined object board, means for clamping a photograph to the underside of said board, frame members extending forwardly from adjacent the upper portions of the opposite sides of said board and downwardly along converging lines, means connecting the forward ends of said frame members, camera lucida mirrors extending between and supported by said frame members for reflecting an image of said photograph, observation means supported by said frame members and providing a peep-hole for viewing the photograph image reflected by said mirrors, an adjustable front leg underlying said observation element and support-porting said connecting means in elevated position, a set of two adjustable rear legs positioned at opposite sides of said object board, means mounted on the said object board and slidably receiving each of said rear legs, and means connected to both of said rear legs for axially adjusting said rear legs simultaneously and relative to said receiving means.

10. In an instrument for transferring detail from an oblique aerial photograph to a map base with the transferred detail in upright position and transformed to correct for photograph tilt, the combination comprising a forwardly inclined frame for supporting a photograph adjacent its marginal edges, an object board connected to said frame for pivotal movement to a position overlying said frame and a photograph resting thereon, frame members secured to the opposite sides of said frame adjacent the top ends thereof and extending forwardly and downwardly along converging lines, means connecting said frame members adjacent their forward ends, camera lucida means extending between and supported by said frame members for reflecting an image of a photograph on said frame, said frame members having an open space therebetween and extending from adjacent said frame toward said camera lucida means to enable observation of the photograph through said space and said frame, observation means providing a peep-hole for viewing a photograph image reflected by said camera lucida means, an adjustable front leg underlying said observation means and supporting said connecting means in a position of elevation corresponding to the adjustment of said leg, and a set of two adjustable rear legs positioned at opposite sides of said frame for supporting said frame and object board in a position of elevation corresponding to the adjustment of said set of legs, said front and rear legs being adapted to rest and slide on a working surface viewed through said observation means to facilitate adjustment of the instrument over the working surface.

11. In a method of sketching maps from oblique aerial photographs, the steps comprising determining the selected depression angle of an oblique aerial photograph, determining the scale of the photograph as compared with the negative for the photograph, positioning the photograph in the field of view of the virtual perspective point of a set of camera lucida mirrors with the true horizon line for the photograph in a relation to the said virtual perspective point corresponding to the relation the horizon line of the photograph negative plane had to the perspective point of the taking camera and corresponding also to the photograph scale, positioning the map base in a plane intersecting the field of view of the actual perspective point of said camera lucida mirrors, the map plane having such spacing and angular arrangement relative to the plane of said actual perspective point and the horizon line of the virtual image of the photograph as to provide a predetermined scale for the map and rectification for tilt variation of the photograph from the selected depression angle, and sketching on the map details of said virtual image to secure map details as they would appear if taken with a truly vertical aerial camera.

12. A method as recited in claim 6, wherein the selected and actual depression angles of the photograph are determined, and the photograph tilt, due to the selected depression angle, is rectified by positioning of the map base in a plane horizontal to the horizon plane of the virtual image of the photograph.

13. A method as recited in claim 6, wherein the selected and actual depression angles of the photograph are determined, and the deviation of the actual depression angle from the selected depression angle is corrected by a corresponding angular relation of the map base and the horizon plane of the virtual photograph image.

14. A method as recited in claim 6, wherein the scale of the map base is determined by its spacing relative to the horizon line of the photograph virtual image.

JAMES L. BUCKMASTER.